Patented June 28, 1949

2,474,704

UNITED STATES PATENT OFFICE 2,474,704

METHOD OF RENDERING MATERIALS WATER-REPELLENT

Mary Elizabeth Thayer, Midland, Mich., assignor to Dow Corning Corporation, Midland, Mich., a corporation of Michigan No Drawing. Application August 11, 1948, Serial No. 43,753. In Great Britain June 29, 1948

8 Claims. (Cl. 99—141)

This invention relates to the treatment of solid materials in such a manner that they are rendered water-repellent.

More particularly, the present invention deals with the hydrophobing of solid materials by contacting them with the vapor of monomethyldiethoxysilane.

Objects of this invention are to provide a simple economical method for rendering surfaces water-repellent, to retard the deliquescence of water-soluble materials, to provide a method for hydrophobing materials which method obviates the necessity of using toxic or corrosive agents, and to provide a method for improving the moisture resistance of foodstuffs. Other objects and advantages will be apparent from the following description:

In accordance with the present invention a solid material is contacted with the vapors of monomethyldiethoxysilane. This renders the material hydrophobic. If desired, the material may then be heated at a temperature of between 30 and 300° C., and below the decomposition temperature and melting point of the material treated. This heating usually improves the moisture resistance of the contacted material.

Monomethyldiethoxysilane may be prepared by the method which is more fully set forth in the copending application of Melvin J. Hunter et al., Serial Number 784,292, assigned to the same assignee as the present invention. The preparation proceeds according to the equation

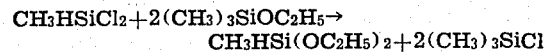
$$CH_3HSiCl_2 + 2(CH_3)_3SiOC_2H_5 \rightarrow CH_3HSi(OC_2H_5)_2 + 2(CH_3)_3SiCl$$

The monomethyldiethoxysilane is separated by distillation. It is a colorless mobile liquid with a boiling point of 98° C. at 740 mm.

In the practice of this invention, it is necessary only to contact the material to be hydrophobed with the vapors of monomethyldiethoxysilane. This process may be carried out by any appropriate method. For example and by way of illustration only, the base member may be placed in an enclosed space, the atmosphere of which is saturated with the vapors of the silane. Alternatively, the vapors of the silane may be passed over or through the material to be treated.

The contacting may be carried out at temperatures ranging from below room temperature to that of the boiling point of the silane. The quality of the water-repellency obtained is independent of the temperature employed during the contacting process.

When desired the base material may be heated after it has been contacted with the silane vapors. It is preferred that the heat treatment be carried out at temperatures ranging from 30° C. to 300° C. for a period of time of from 5 minutes to one hour. With organic materials such as sugar the preferred range is 30° C. to 150° C.

A wide variety of materials are rendered water-repellent when contacted with monomethyldiethoxysilane in the manner of this invention. These include inorganic substances such as ceramics, asbestos, and metals; organic polymeric materials such as cotton, wool, silk, paper, and synthetic plastics; and organic and inorganic crystalline hygroscopic materials such as sodium chloride, sugar, etc.

The mechanism by which the vapors of the silane renders materials water-repellent is not definitely known. One explanation is that the molecules of silane are absorbed on the surface of the base material and thereupon react with either surface or atmospheric moisture to produce a siloxane film. However, it is to be understood that this invention is not restricted to this theory as to the reason for the operativeness of the process.

The present method offers an economical and expeditious way to hydrophobe materials. By the use of this method, it is possible to apply a thin, non-corrosive, water-repellent film to the base material. Since the vapor method is used the amount of silane deposited on the treated material is readily controlled by regulating the time of exposure. With the present method, there is no necessity for using solvents either to apply the silane coating or to remove excess coating once it is applied.

This invention is particularly applicable to hydrophobing food materials. Monomethyldiethoxysilane does not deleteriously affect food products and the film remaining after the materials have been treated is odorless, tasteless, colorless and non-toxic. Not only is the present method applicable for use with hygroscopic food products such as sugar and salt, but it may be used equally well to treat toasted food products. Thus, as a consequence of contacting them with the vapors of monomethyldiethoxysilane toasted foods, such as prepared cereals, crackers, etc., retain their crispness for longer periods of time when in contact with liquids such as milk, than do the corresponding untreated foods.

It has been found that the amount of the silane absorbed by the food materials when contacted in the manner of this invention ranges from 0.1 to 5 percent by weight.

Sugar which has been treated in the manner of this invention is of special utility in the coating of confection materials such as chewing gum, marshmallows, and sugar-coated candy. It has been found that when such products are coated with the treated sugar that the confections do not become moist and sticky when exposed to the atmosphere even during hot, humid, summer weather. Thus, the value of this invention as a method of preserving food products is obvious.

In order that those skilled in the art may better understand this invention, recourse should be had to the following examples which should be considered as illustrative only.

EXAMPLES

*Example 1*

A sample of powdered sugar was placed in a desiccator over an open dish containing monomethyldiethoxysilane. After 10 hours the sample was removed and heated one hour at 100° C. When this sugar was placed on the surface of water, it remained afloat for 30 minutes. In contrast, untreated powdered sugar dissolved at once when placed upon the surface of water.

*Example 2*

Sugar which had been treated as in the previous example was heated for 10 minutes at 50° C. It was then cooled and applied to the surface of marshmallows. The marshmallows were then exposed to the atmosphere. They remained dry for 3 days during hot, humid, summer weather. By comparison, marshmallows coated with untreated sugar became sticky after 12 hours exposure under the same conditions.

*Example 3*

A piece of cotton cloth was placed in a desiccator along with an open beaker partly filled with monomethyldiethoxysilane. The desiccator was closed and the system was allowed to stand 24 hours at room temperature. The cloth sample then was removed and heated at 150° C. for 5 minutes. The sample gave a spray rating of 100 percent. The spray test was conducted in accordance with the standard process shown in the 1946 Year Book of "American Association of Textile Chemist and Colorist," vol. 23, pages 240 to 244.

*Example 4*

A sample of felt was allowed to remain in an atmosphere containing the vapors of monomethyldiethoxysilane for 17 hours. The cloth was then removed and heated one hour at 105° C. and 15 minutes at 150° C. The sample had a moisture pick up of 77 percent as compared with 188 percent for an untreated piece of felt. These tests were run in accordance with the standard process shown in the 1946 Year Book of "American Association of Textile Chemist and Colorist," vol. 23, pages 244 to 245.

*Example 5*

Blotter paper was contacted with the vapors of monomethyldiethoxysilane at room temperature for 6 hours. The sample was then heated at 150° C. for 5 to 10 minutes. When a drop of ink was placed on the treated paper it remained unabsorbed for a period of about 30 minutes. By contrast the ink was absorbed immediately when placed on untreated blotter paper.

That which is claimed is:

1. A method of treating a solid organic base material which comprises contacting said material with the vapor of monomethyldiethoxysilane whereby the material is rendered water-repellent.

2. A method of treating an organic fibrous material which comprises contacting the fibrous material with the vapor of monomethyldiethoxysilane whereby said material is rendered water-repellent.

3. A method of rendering an organic fibrous material water-repellent which comprises contacting the fibrous material with the vapor of monomethyldiethoxysilane and thereafter heating said material at a temperature up to 150° C. for at least 5 minutes.

4. A method of treating a solid hydrophilic food material which comprises contacting said material with the vapor of monomethyldiethoxysilane whereby said material is rendered moisture-resistant.

5. A method of treating a solid, soluble, hygroscopic food material which comprises contacting said material with the vapors of monomethyldiethoxysilane whereby said material is rendered moisture-resistant.

6. A method of treating sugar which comprises contacting it with the vapor of monomethyldiethoxysilane and thereafter heating the sugar at a temperature up to 150° C. for at least 5 minutes.

7. A method of rendering a confectionery material non-hygroscopic which comprises coating the material with sugar which has been contacted with the vapor of monomethyldiethoxysilane and thereafter heated at a temperature up to 150° C. for at least 5 minutes.

8. A process for rendering a confectionery material non-hygroscopic which comprises contacting sugar with the vapors of monomethydiethoxysilane, heating the contacted sugar at a temperature up to 150° C. for at least 5 minutes and thereafter applying the sugar to the surface of the confectionery material.

MARY ELIZABETH THAYER.

REFERENCES CITED

The following references are of record in the file of this patent:

UNITED STATES PATENTS

| Number | Name | Date |
|---|---|---|
| 1,902,773 | Hale | Mar. 21, 1933 |
| 2,183,173 | Segura | Dec. 12, 1939 |
| 2,439,689 | Hyde | Apr. 13, 1948 |